(12) United States Patent
Sato et al.

(10) Patent No.: US 7,521,672 B2
(45) Date of Patent: Apr. 21, 2009

(54) IONIZATION PLATE FOR MASS SPECTROMETRY AND MASS SPECTROMETER

(75) Inventors: Hiroaki Sato, Tsukuba (JP); Atsushi Yamamoto, Tsukuba (JP); Teruyuki Seino, Tsukuba (JP); Masaki Torimura, Tsukuba (JP); Hiroaki Tao, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 421 days.

(21) Appl. No.: 11/412,701

(22) Filed: Apr. 27, 2006

(65) Prior Publication Data

US 2006/0255262 A1 Nov. 16, 2006

(30) Foreign Application Priority Data

Apr. 28, 2005 (JP) ............................. 2005-131588
Apr. 20, 2006 (JP) ............................. 2006-116525

(51) Int. Cl.
*H01J 49/00* (2006.01)
(52) U.S. Cl. ...................... 250/288; 250/281; 250/282
(58) Field of Classification Search ................ 250/288, 250/282, 281; 428/650, 651; 977/701
See application file for complete search history.

(56) References Cited

U.S. PATENT DOCUMENTS

| 7,122,790 | B2 * | 10/2006 | Fonash et al. ............... 250/288 |
|---|---|---|---|
| 2002/0048531 | A1 * | 4/2002 | Fonash et al. ............... 422/68.1 |
| 2003/0173513 | A1 | 9/2003 | Koopmann et al. |
| 2004/0033679 | A1 * | 2/2004 | Jacobson et al. ............ 438/510 |
| 2004/0038423 | A1 | 2/2004 | Smirnov et al. |
| 2004/0104343 | A1 * | 6/2004 | Furuta et al. ................ 250/288 |
| 2005/0037398 | A1 * | 2/2005 | Gelfand et al. ................. 435/6 |
| 2005/0048581 | A1 * | 3/2005 | Chiu et al. .................... 435/7.1 |
| 2005/0170336 | A1 * | 8/2005 | Belcher et al. ................. 435/5 |
| 2005/0181195 | A1 * | 8/2005 | Dubrow ................... 428/297.4 |
| 2006/0159916 | A1 * | 7/2006 | Dubrow et al. .............. 428/357 |
| 2006/0211187 | A1 * | 9/2006 | Choi et al. ................... 438/197 |
| 2007/0023627 | A1 * | 2/2007 | Finch et al. ................. 250/282 |
| 2007/0298515 | A1 * | 12/2007 | Diamond et al. ............ 436/173 |
| 2008/0073505 | A1 * | 3/2008 | Niu et al. .................... 250/288 |
| 2008/0118755 | A1 * | 5/2008 | Whiteford et al. ........... 428/403 |

FOREIGN PATENT DOCUMENTS

| DE | 10054806 A1 | 5/2002 |
|---|---|---|
| JP | 2003098149 A | 4/2003 |
| WO | WO 2004/051253 A1 | 6/2004 |
| WO | WO 2005/059552 A1 | 6/2005 |

* cited by examiner

*Primary Examiner*—Jack I Berman
*Assistant Examiner*—Michael J Logie
(74) *Attorney, Agent, or Firm*—Wall & Tong, LLP

(57) ABSTRACT

Provided are a laser desorption ionization mass spectrometry sample plate for a soft LDI-MS measurement, in which when a laser beam is irradiated, a correct measurement of high sensitivity can be made without generation of any disturbance peak and uniform coating of a sample can be made on a sample plate in fabrication of the sample, and a measurement apparatus using the sample plate. A specified ionization element having a dot structure is used as an ionization medium which is used in laser desorption ionization mass spectrometry and absorbs a laser beam.

19 Claims, 8 Drawing Sheets

Embodiment 1

Comparative Example 1

Embodiment 2

Embodiment 3

Embodiment 4

Embodiment 5

IONIZATION PLATE FOR MASS SPECTROMETRY AND MASS SPECTROMETER

BACKGROUND OF THE INVENTION

1. Field of the Invention

The present invention relates to a sample plate for laser desorption ionization mass spectrometry and a laser desorption ionization mass spectrometer using the sample plate.

2. Description of Related Art

There has been increased the necessity for a measuring method of molecular weights of high molecular compounds composed of an organism-related substance such as protein, peptide, sugar, oligonucleotide, etc., and synthetic high molecular compounds, and importance is attached to the use of mass spectrometry as the method. In mass spectrometry, a sample is ionized to achieve separation of ions on the basis of a mass-to-charge ratio. In mass spectrometry of high molecular compounds, there are adopted LDI-MS (Laser Desorption Ionization-Mass Spectrometry) and a measuring apparatus therefor.

When a laser beam is irradiated directly on a sample, which is composed of a high molecular compound, in order to ionize the sample, decomposition of the sample is caused. Hereupon, there is generally used a method, in which decomposition of a sample is avoided by coating the sample on a medium, which absorbs a laser beam, or supplying the sample in a mixed state. The ionization method free of decomposition of a sample is called a soft LDI-MS, a typical example of which adopts Matrix-Assisted Laser Desorption Ionization-Mass Spectrometry (MALDI-MS). A mixed solution composed of a low molecular organic compound, which is called a matrix reagent and absorbs a laser beam, and a sample solution is applied on a mass spectrometry sample plate to be dry-crystallized, thus forming a sample on the plate.

In measurement with a mass spectrometer, the sample formed on the plate is mounted in an ion source and a laser beam is irradiated on a surface of the sample. A matrix reagent having absorbed the laser beam efficiently is momentarily vaporized and ionized. At that time, sample molecules taken in as a mixed crystal are vaporized substantially simultaneously and give and receive an electric charge from the matrix reagent whereby the sample molecules are ionized without little decomposition. After ions as generated are mass-separated owing to an action of a mass separation part of a time-of-flight type, a quadrupole type, an ion-trap type, a sector type, a Fourier transformation type, or a composite type thereof, the ions are detected by a detector and mass is analyzed.

Among these, a method of using a mass separation part of a time-of-flight type involves no limit for mass range of measurement in principle, so that Matrix-Assisted Laser Desorption Ionization-Time of Flight Mass Spectrometry (MALDI-TOFMS) is generally used in mass spectrometry for high molecules.

It is said that when laser desorption ionization is combined with a time-of-flight type mass spectrometer, detection up to immunoglobulin M (molecular weight of ca. 900 kDa) can be made and a limit of detection reaches an amol level. Also, compounds capable of ionization cover a wide range of general organism-related substances such as peptide, protein, polysaccharides, compound lipid, nucleic acid-related substances, etc., synthetic polymer, oligomer, metal coordination compounds, and inorganic compounds. In case of using a matrix, various substances are used as the matrix ("Bunseki", No. 4, 253 to 261 (1996)).

In order to give a high resolving power, there has been proposed a sample feeding apparatus for analysis of a sample comprising a plate having a flat surface, which gives electroconductivity to the apparatus, and in which the flat surface is electroconductive to have a resistance of less than about 1500 ohm per 1 square inch, the flat surface is coated with a graphite paint, and the plate is made of a material selected from polypropylene, polyethylene, polystyrene, polycarbonate, etc. (JP-A-2003-43014).

There is known a probe, a sample of which placed surface is decorated by means of energy absorptive molecules and which serves as means for enabling mounting and dismounting to bring about favorable results of molecules being an object of analysis without addition of foreign matrix molecules, which is carried out in the related art, the surface containing synthetic polymer, glass, or ceramic (JP-A-2000-131285). Also, there is known a metallic sample plate placed surface having a larger hydrophilic property than that of the metal itself, more specifically, the surface being subjected to hydrophilic treatment such as plasma treatment, etc. (JP-A-2004-347524).

In MALDI-MS described above, a low molecular organic compound is used as an ionizing reagent, so that disturbance ions are generated attributable thereto. Besides, since the disturbance ions thus generated not only cover in the vicinity of a molecular weight (a mass number of 500 or less) of the organic compound but also form a cluster to cover a range of mass number of several thousands or more, analysis becomes difficult in many cases.

Also, since kinds of matrix reagents suited to ionization are different according to samples in MALDI-MS described above, there is an inconvenience that an appropriate matrix reagent must be selected trial and error when samples being measured are prepared.

Therefore, there has been proposed a soft LDI-MS, in which a fine powder inorganic compound is used as an ionizing agent for ionization.

Known as the fine powder inorganic compound are, for example, cobalt fine powder (JP-A-62-43562, JP-A-63-318061), titanium oxide fine powder (C. T. Chen, Y. C. Chen: Anal. Chem., 76, 1453 (2004)), graphite powder (J. Sunner, E. Dratz, Y. C. Chen, Anal. Chem., 67, 4335 (1955)), carbon nanotube (S. Xu, Y. Li, H. Zou. J, Qiu. Z, Guo, B. Guo,: Anal. Chem., 75, 6191 (2003)), a carbon black solid having an average particle size of 100 nm or less and a PVC blackness of 50 or less (JP-A-2000-180413), a support plate for crystallization of an additive for mass spectrometry, made of a layer, at least a surface of which contains carbon, the additive for mass spectrometry being used in combination with α-cyano-4-hydroxy cinnamic acid (JP-A-2001-13110), and the like.

In such a method, in which fine powder is used, a solution-like sample and a suspension solution composed of fine powder are coated on a surface of a sample plate for mass spectrometry, so that it is difficult to uniformly coat a sample and frequently becomes difficult in the case where mass spectrometry is performed with high efficiency. Further, irradiation of a laser beam sometimes disperses an ionization medium in an ion source and contamination thereby causes a problem.

Hereupon, there has been proposed a soft LDI-MS, in which a porous silicon plate is used as a sample plate (J. Wei, J. M. Buriak, G. Siuzdak: Nature, 399, 243 (1999)). This method is called DIOS-MS (desorption/ionization-mass spectrometry on porous silicon). In this method, mass spectrometry is performed by coating a sample solution on a surface of a porous silicon plate having fine holes of nanometer level, mounting the plate in an ion source of a mass spectrometer after drying, and irradiating a laser beam on a sample surface in subsequent operations like MALDI-MS. While a detailed principle of ionization in DIOS-MS is not apparent, it is thought that a nanosilicon structure absorbs a laser beam with high efficiency to be rapidly heated whereby instantaneous desorption of sample molecules occurs, and a component bonded to or absorbed by a porous silicon is ionized to deliver an electric charge to the sample molecules whereby ionization of the sample is attained. Also, there is used a silicon nanowire grown on gold minute particles, which are precipitated on a silicon plate (E. P. Go, J. V. Apon, G. Luo, A. Saghatelian, R. H. Daniels, V. Sahi, R. Dubrow, B. F. Cravatt, A. Vertes, G. Siuzdak: Anal. Chem., 77, 1641 (2005)). Also, there are proposed a plate, a surface portion of which is provided with recesses and made of a plastic material, covered by a metallic film, and subjected to silicon etching, and a chip that uses a sponge-like substance (JP-A-2004-184137).

Since DIOS-MS uses a sample plate itself as an ionization medium, there is produced an advantage that it is relatively easy to uniformly coat a sample, and it is possible to avoid generation of a disturbance peak, which causes a problem in MALDI-MS. Since the efficiency of ionization of a porous silicon is greatly affected by conditions of fabrication and it is extremely difficult to fabricate sample plates having the same porous structure with good reproductivity, it is hard under present circumstances to say that DIOS-MS is a reliable technology of mass spectrometry. Further, since most of samples once coated are taken into a porous structure, a major part of sample molecules is not ionized and remains to make an obstacle in measurement with high sensitivity and cleaning of a sample plate after measurement is not easy and responsible for prevention of generation of a peak attributable to a sample for a previous measurement, so that DIOS-MS is not so much suited to repeated measurement.

Also, in the method of using a silicon nanowire, since gold minute particles making a base material of the nanowire are bonded to a silicon substrate automatically in an unstable state, a nanowire gold minute particle structure is susceptible to failure in irradiation of a laser beam during measurement, or in a cleaning step of a sample plate after measurement, so that DIOS-MS is not so much suited to repeated measurement.

Because of the above, there have been earnestly desired to develop a plate, on which a sample solution can be uniformly coated, and which does not generate any disturbance peak even when a laser beam is irradiated after being coated with the sample solution, is easy to clean after measurement, can be applied to analysis of various kinds of samples, and enables measurement with high sensitivity, a method of laser desorption ionization mass spectrometry, in which a plate coated with the sample solution is used to prevent generation of any disturbance peak, and an apparatus therefor.

It is desirable to provide a sample plate for laser desorption ionization mass spectrometry, which serves for a soft LDI-MS measurement, does not generate any disturbance peak even when a laser beam is irradiated thereon, enables correct mass spectrometry of high sensitivity on various samples such as organism-related substances, synthetic organic compounds, etc. and enables uniformly coating a sample thereon in fabrication of a sample, and of which cleaning after measurement is easy, and a measuring apparatus using the sample plate.

The inventors of the present application have earnestly carried on studies to provide such a sample plate, on which a sample solution can be uniformly coated, and which does not generate any disturbance peak even when a laser beam is irradiated after being coated with the sample solution, and is easy to clean after measurement. They proposed an ionization plate, for which a pyroelectric single crystal plate is used, as a plate coated with the sample solution (Japanese Patent Application No. 2005-013433). but satisfactory results are not produced.

SUMMARY OF THE INVENTION

Taking account of this, the inventors of the present application have earnestly continued studies to develop an ionization plate of further high performance and have consequently found a single-crystal plate does not produce satisfactory results because of a small specific surface area. The inventors have found an increase in specific surface area is important in order to attain a high sensitivity and, in accordance with the present invention, they provide a sample plate having convex-shaped dot structures on a surface. The surface may be of a smooth single-crystal plate. A plate having a dot structure on a surface thereof is referred below to as an ionization element.

In accordance with an embodiment of the invention a dot structure, which absorbs a laser beam with high efficiency, on a single crystal plate and using the plate as an ionization medium, does not generate disturbance peaks when a laser beam irradiates the plate, and so a soft LDI-MS measurement of high sensitivity can be correctly performed on a wide range of polymer compounds.

It has been found that since the ionization element comprises a plurality of convex-shaped dot structures formed on a smooth single crystal plate, cleaning after measurement is made easy as compared with the case where a conventionally known porous body is used, and the ionization element can withstand repeated measurements by virtue of prevention of contamination by a sample in a previous measurement.

Further, it has been found that since fine convex-shaped dot structures are formed countlessly on the ionization element, a considerable increase in specific surface area results and a sharp increase in sensitivity of detection results as compared with the case where a pyroelectric single crystal plate according to the previous application is used.

A dot structure formed from a metal or a semiconductor, which absorbs a laser beam and can distribute the energy thereof to desorption of a sample, is appropriate as an ionization element of the invention, and there are listed, as typical dot structures, an InAs or InGaAs mixed crystal grown epitaxially on a GaAs substrate, or an InN or InGaN mixed crystal grown epitaxially on a GaAs substrate, an InN or InGaN mixed crystal grown epitaxially on a GaN substrate, an InN, GaN or InGaN mixed crystal grown epitaxially on an AlN substrate, a GaSb, InSb or InGaSb mixed crystal grown epitaxially on a GaAs substrate, an InSb or InGaSb mixed crystal grown epitaxially on a GaSb substrate, or SiGe alloy grown epitaxially on a Si substrate, or the like.

Since the ionization element of an embodiment of the invention is made of an inorganic compound, it is possible in a soft LDI-MS measurement to avoid generation of a disturbance peak inherent in an ionization medium.

Also, there has conventionally been examined a method of using a fine processing such as etching, etc. with a view to an increase of a plate surface in specific surface area, the method having partially come into practical use as the DIOS technology described above (S. Xu, Y. Li, H. Zou, J. Qiu, Z. Guo, B. Guo: Anal. Chem., 75, 6191 (2003)). However, a plate having such surface structure has a disadvantage that a fine structure is broken when absorbing a laser beam, and lumps of a plate substance separate from the plate to be ionized to generate a disturbance peak. This is a phenomenon occurring since the fine structure of the plate is weak in mechanical bonding strength.

That is, the bonding strength of atoms, which form the fine structure of a plate surface in a DIOS type ionization element, can become a smaller energy than energy absorbed by the DIOS type ionization element, so that the fine structure is broken and separates.

Accordingly, (separation energy of a measured sample)<(energy of laser absorbed by a plate)<(bond energy of atoms, which form the fine structure of a plate) is required to be established in order that a plate withstand laser irradiation of plural times and a stable repeatability of analysis be provided.

In this respect, a projection-shaped structure on a smooth surface in an embodiment of the invention bonds chemically and strongly to a plate and the convex structure is not broken and separated due to laser irradiation. Therefore, soft ionization free of noise is made possible.

In a soft LDI-MS measurement, high voltage in the order of 20000 volts is applied to a sample plate to accelerate generated ions. The ionization element may be mounted on a conductive sample plate holder. If a double tape or a plastic part is used for the fixation, reduction in degree of vacuum and contamination inside an apparatus which are caused by gas components discharged therefrom can cause a problem. Also, there is a fear that when fixation is effected by a metallic jig, the sample plate is damaged or broken. Hereupon, it has been found that a mass spectrometer can be made simple by forming a conductive layer, such as a thin metallic film, etc., on at least a part of the ionization element except a portion coated with a sample to make the element integral with a sample plate holder, and a mass spectrometer of high performance can be obtained by prevention of reduction in degree of vacuum and contamination.

In accordance with embodiments of the present invention, there is provided:

(1) A sample plate for laser desorption ionization mass spectrometry, wherein a substance is stuck to a flat plate surface to form a surface, on which a plurality of convex dot structures are distributed, and the plate is used as an ionization medium used in laser desorption ionization mass spectrometry.

(2) The sample plate for laser desorption ionization mass spectrometry, according to (1), wherein the dot structures on the ionization medium bond chemically firmly with a plate surface to be fixed firmly to the plate surface.

(3) The sample plate for laser desorption ionization mass spectrometry, according to (1) or (2), wherein the dot structures on the ionization medium are formed on the basis of a self-organizing phenomenon of a substance, which is physically deposited on the plate surface.

(4) The sample plate for laser desorption ionization mass spectrometry, according to (1) or (2), wherein the dot structures on the ionization medium are formed on the basis of a self-organizing phenomenon of a substance, which is chemically deposited on the plate surface.

(5) The sample plate for laser desorption ionization mass spectrometry, according to (1) or (2), wherein the dot structures on the ionization medium are formed by accumulating a microcrystal with a specific size on the plate surface.

(6) The sample plate for laser desorption ionization mass spectrometry, according to any one of (1) to (5), wherein the dot structures on the ionization medium are grown epitaxially on a plate crystal.

(7) The sample plate for laser desorption ionization mass spectrometry, according to any one of (1) to (6), wherein the dot structures on the ionization medium comprise a semiconductor.

(8) The sample plate for laser desorption ionization mass spectrometry, according to any one of (1) to (7), wherein the dot structures are selected from at least one or more materials, which are different from a plate material.

(9) The sample plate for laser desorption ionization mass spectrometry, according to any one of (1) to (8), wherein the dot structures are formed on a single crystal semiconductor plate surface.

(10) The sample plate for laser desorption ionization mass spectrometry, according to (7), wherein the dot structures are composed of Ge to be formed on a single crystal Si substrate.

(11) The sample plate for laser desorption ionization mass spectrometry, according to (7), wherein the dot structures are selected from an InAs or InGaAs mixed crystal grown epitaxially on a GaAs substrate, or an InN or InGaN mixed crystal grown epitaxially on a GaAs substrate, an InN or InGaN mixed crystal grown epitaxially on a GaN substrate, an InN, GaN or InGaN mixed crystal grown epitaxially on an AlN substrate, a GaSb InSb or InGaSb mixed crystal grown epitaxially on a GaAs substrate, an InSb or InGaSb mixed crystal grown epitaxially on a GaSb substrate, or a SiGe alloy grown epitaxially on a Si substrate.

(12) The sample plate for laser desorption ionization mass spectrometry, according to any one of (1) to (11), wherein a sample coated portion of the sample plate for laser desorption ionization mass spectrometry is chemically midified.

(13) The sample plate for laser desorption ionization mass spectrometry, according to any one of (1) to (12), wherein a portion, except a sample coated portion, of the sample plate for laser desorption ionization mass spectrometry is formed from a conductive substance.

(14) A sample for laser desorption ionization mass spectrometry, obtained by coating a solved sample on a surface of the sample plate for laser desorption ionization mass spectrometry, according to any one of (1) to (13), to dry the same.

(15) A laser desorption ionization mass spectrometer comprising the sample plate for laser desorption ionization mass spectrometry, according to any one of (1) to (14).

When a sample plate for laser desorption ionization mass spectrometry, according to an embodiment of the invention is used, a disturbance peak inherent in an ionization reagent is not generated at the time of irradiation of a laser beam, so that correct measurement can be performed. Also, with the use of the ionization medium composed of the projection-shaped dot structures formed on a surface, there is obtained a sample plate, in which cleaning after measurement is made easy as compared with the case where a conventionally known porous body is used, and which can withstand repeated measurements by virtue of prevention of contamination caused by a sample in a previous measurement.

An ionization plate according to an embodiment of the invention is made of an inorganic compound and the plate surface coated with a measured sample is chemically stable. Surface instability like a fine, porous ionization plate is eliminated and measurement data can be reproduced at all times.

An ionization plate according to an embodiment of the invention is formed on a surface thereof with convex dot structures. A considerable increase in specific surface area results as compared with the case where a pyroelectric single crystal plate according to the previous proposal so that it is possible to form a thin film of a sample component in a large area with the result that high sensitivity can be attained. Also, since a plate according to an embodiment of the invention can be manufactured by means of a general dry processing such as the molecular-beam epitaxy method, etc., it is thought that mass production is easy as compared with a wet processing, such as etching, etc., with hydrofluoric acid, which is needed in manufacture of a fine, porous ionization plate according to the related art.

DESCRIPTION OF ILLUSTRATIVE EMBODIMENTS

Figure 1:
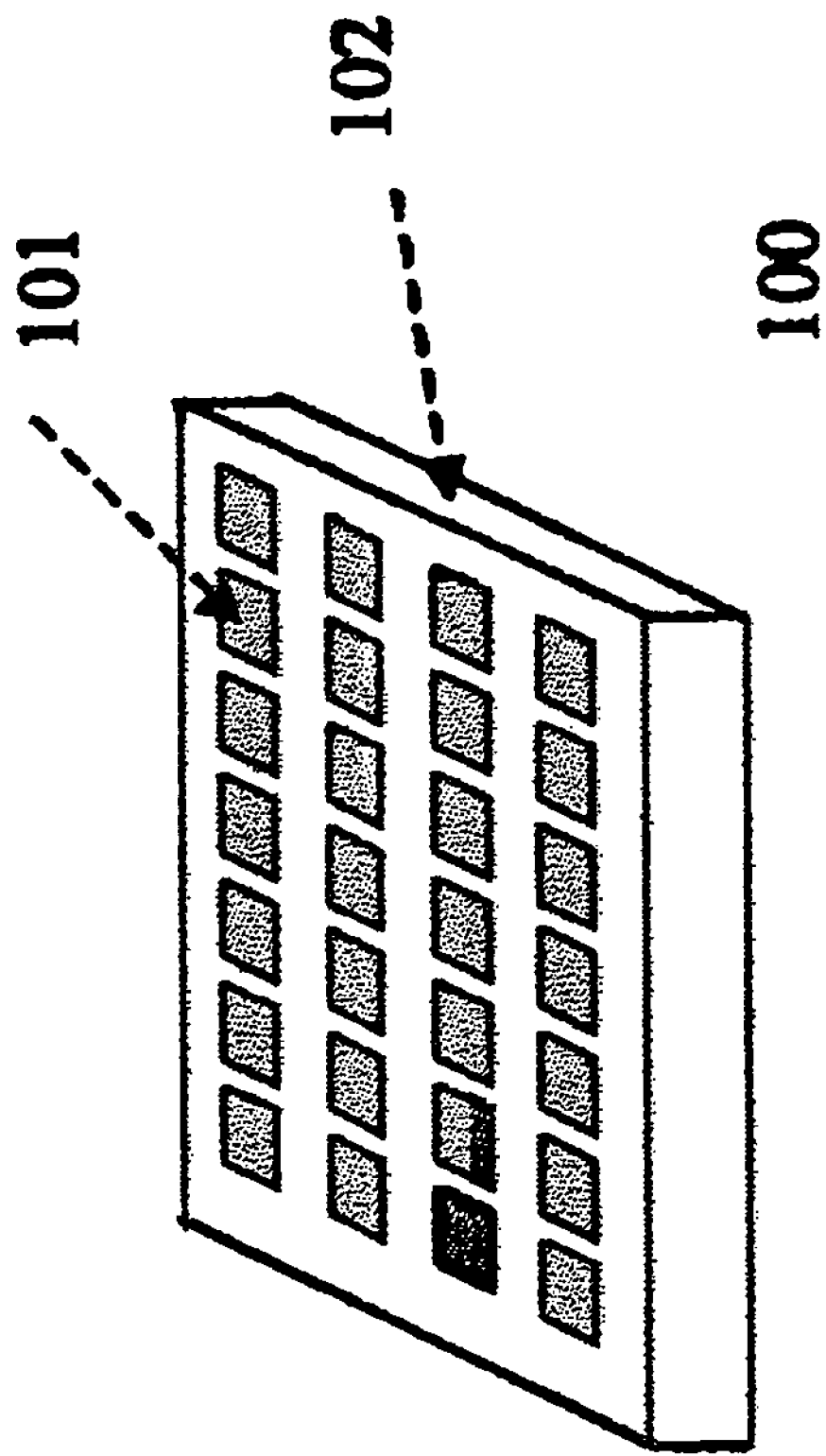
FIG. 1 is a view showing a structure of a mass spectrometry plate according to an embodiment of the invention.

FIG. 1 is a view showing a structure of a sample plate 100 for mass spectrometry, according to the invention, in the case where ionization elements are stuck to a sample holder used as a sample holding part of a mass spectrometer of a soft LDI-MS.

Figure 2:
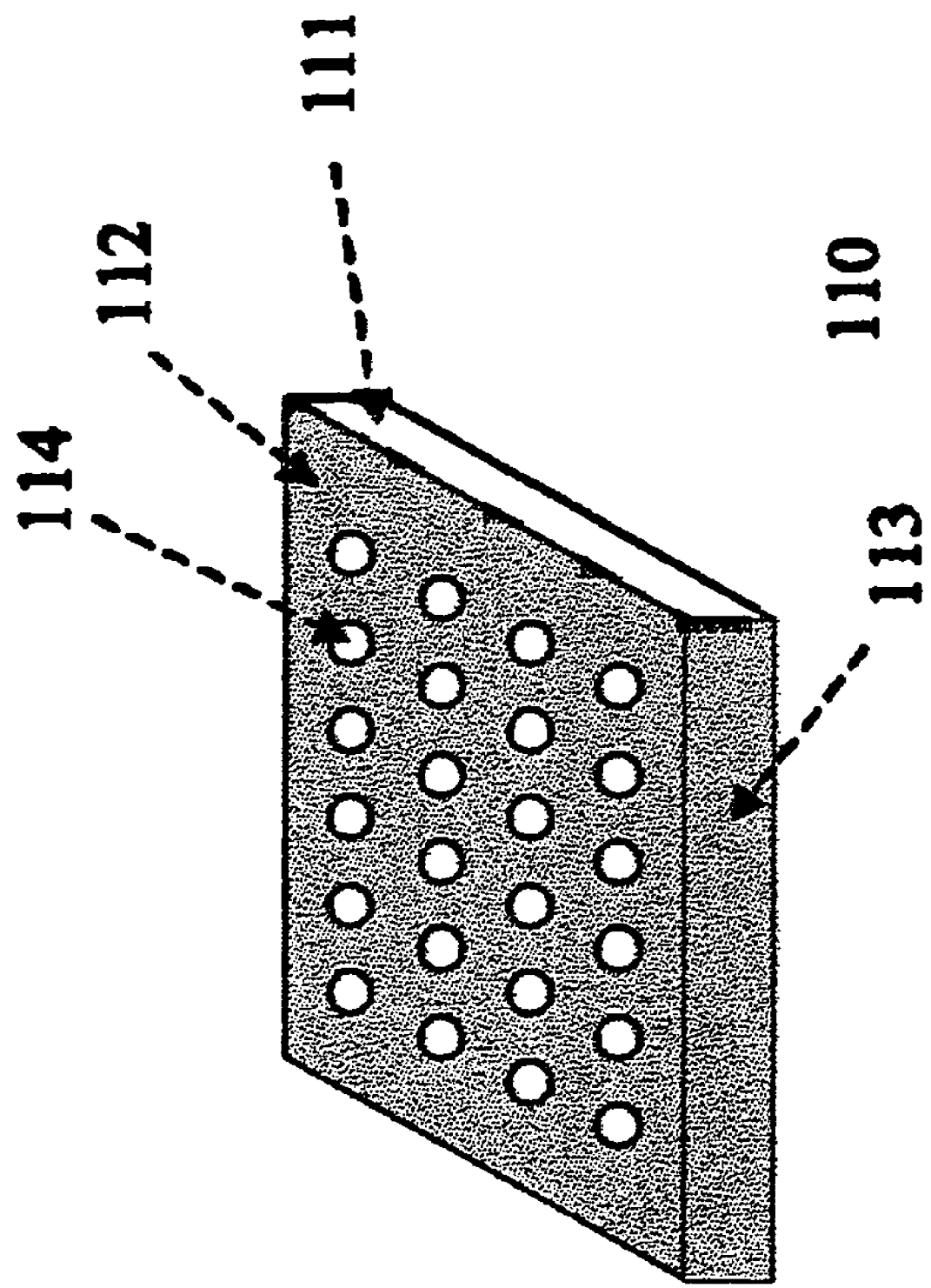
FIG. 2 is a view showing the structure of another mass spectrometry plate according to an embodiment of the invention.

FIG. 2 is a view showing a structure of a sample plate 110 for mass spectrometry in the case where a conductive layer is applied to an element surface.

With the case in FIG. 1, the sample plate 100 for mass spectrometry is formed by crystal ionization elements 101, which act as an ionization medium, and a conductive sample plate holder 102, which supports the crystal ionization elements. A sample solution is applied to surfaces of the ionization elements 102.

A dot structure can be used for the ionization elements.

As the dot structure, there are listed semiconductors made of alloys such as an InAs or InGaAs mixed crystal grown epitaxially on a GaAs substrate, or an InN or InGaN mixed crystal grown epitaxially on an GaAs substrate, an InN or InGaN mixed crystal grown epitaxially on a GaN substrate, an InN, GaN or InGaN mixed crystal grown epitaxially on an AlN substrate, a GaSb, InSb or InGaSb mixed crystal grown epitaxially on a GaAs substrate, an InSb or InGaSb mixed crystal grown epitaxially on a GaSb substrate, or a SiGe alloy grown epitaxially on a Si substrate, or the like. The invention is not limited to the above provided that ionization elements absorb a laser beam with high efficiency.

A dot structure is formed by the following methods.

(1) A method, in which a dot structure is formed on the basis of a self-organizing phenomenon of a substance, which is physically deposited on a substrate surface, on the substrate surface. In this method, the substance is accumulated on the substrate surface by means of evaporation from an evaporation source and the substance is heated whereby a dot structure is fabricated in a self-organizing manner. For example, when Ge is deposited on a Si(100) substrate surface, which is heated to 540° C., at a speed of 0.01 nm/sec. in the vacuum of around $10^{-6}$ Pa, a Ge dot structure is formed owing to a difference in lattice constant.

(2) A method, in which a dot structure is formed on the basis of a self-organizing phenomenon of a substance, which is chemically formed on a substrate surface, on the substrate surface. When for example, a CVD apparatus capable of accumulating Ge on a substrate surface through the decomposition reaction of $GeH_4$ is used, a Ge dot structure is formed on a Si(100) substrate surface by appropriately controlling a substrate temperature and an accumulating speed.

(3) A method, in which a dot structure is formed by accumulating microcrystals of a specific magnitude on a substrate surface.

Methods of forming a dot structure on a substrate surface include the molecular-beam epitaxy method (MBE), the metalorganic vapor phase epitaxy method (MOVPE), the liquid phase growth method, the sputtering method in ultra-high vacuum, etc. while all epitaxial growth methods of semiconductors are effective in the invention.

A quantum dot is preferred for the structure. A structure, in which many semiconductor dots having a magnitude of about 20 to 100 nm or less are embedded into a separate semiconductor crystal having a large energy gap, is called a quantum dot, and such quantum dot is made use of in storage elements of a quantum computer, plane emission laser, etc., while a substance, which absorbs energy of laser beam, etc. makes it possible to make use of a quantum dot as ionization elements in the invention.

Even a dot structure having a magnitude of 20 to 100 nm or more and said not to produce any quantum effect is effective in the invention provided that an associated element absorbs a laser beam with high efficiency.

Any projection-shaped dot structure on a smooth surface having a space at least a few nanometer to a few micrometer between each dot is effective to make use as ionization elements in the invention provided that the shape and distribution of an associated element does not lie one upon another.

It is thought that a dot structure element formed in this manner absorbs a light energy of a specific wavelength of laser light oscillated from laser such as nitrogen laser (having a wavelength of 337 nm), Nd:YAG laser (having a wavelength of 266, 355, 532, 1064 nm), etc. and is rapidly heated thereby, and thus ionization desorption of sample molecules adsorbed by a surface thereof is caused.

With a soft LDI-MS, it is thought that since a high voltage of around 20,000 volts is generally applied to a sample plate or a sample plate holder substantially simultaneously with irradiation of laser beam, ionized sample molecules immediately spring from the sample plate due to electric repulsion and are introduced into a mass separation part to be subjected to mass spectrometry. That is, sample molecules do not receive energy required for ionization and desorption directly from a laser beam but is given such energy indirectly from the sample plate, so that an expected object can be attained, in which soft ionization accompanied by little decomposition of sample molecules is achieved efficiently and mass spectrometry can be performed efficiently.

Preparation of samples is made by dissolving the samples into water or an organic solvent.

A biopolymer compound such as protein, sugar, etc. is dissolved into a mixed solution (an acetonitrile content being 5 to 75%) of water containing a trifluoroacetic acid of 0.1 to 1% and acetonitrile to prepare a sample solution having a concentration of 1 to 100 pmol/μL. According to the solubility of samples, water or a solution containing acetonitrile of 100% may be used and an organic solution such as methanol, ethanol, propanol, acetone, etc. may be selected in place of acetonitrile.

Also, salt such as sodium chloride, potassium chloride, sodium bromide, etc. may be added in measurement of sugar contained in the biopolymer compound so as to provide for a concentration of 0.1 to 1 mg/mL in order to generate stable sample ions and to generate alkali cation addition molecules.

A synthetic organic compound containing a synthetic polymer and oligomer is dissolved into an organic solution, into which samples are soluble, to prepare a sample solution having a concentration of 0.1 to 1 mg/mL. As the organic solution, there are listed chloroform, tetrahydrofuran, ethyl acetate, acetone, acetonitrile, propanol, ethanol, methanol, etc. but they are not limitative provided that samples are dissolved. Also, water-soluble synthetic macromolecules such as polyethylene glycol, etc. may be dissolved into water or a mixed solution of water and an organic solvent. Further, in order to generate stable sample ions, salt such as sodium chloride, potassium chloride, sodium bromide, silver trifluoroacetate, silver nitrate, etc. may be added so as to provide for a concentration of 0.1 to 1 mg/mL.

A sample solution of 0.1 to 1 μL is coated directly on the sample plate and subjected to air drying at room temperature, thus enabling obtaining uniform dried samples.

The conductive sample plate holder 102 shown in FIG. 1 is used as an electrode of ion acceleration of a mass spectrometer to afford application of high voltage. A stainless steel sample plate for LDI-MS can be used for the material. The material suffices to be electrically conductive, and is not limited to the above material.

A metallic film may be formed in a location except sample coating spots of an element surface to be given electroconductivity to act as an electrode of ion acceleration of a mass spectrometer. That is, a metallic film 112 is formed on a surface of a plate holder 111 provided with the ionization element shown in FIG. 2 and a conducting part 113 formed on sides and a back surface thereof with a metallic film affords electric conduction to an electrode of ion acceleration voltage of a mass spectrometer. With such construction, the conductive sample plate holder 102 shown in FIG. 1 is dispensed with, so that it is possible to make the mass spectrometer simple. Also, a constituent material such as double tape, etc. for mounting the elements 101 on the conductive sample plate holder 102 is dispensed with, so that it is possible to suppress reduction in degree of vacuum and contamination in the mass spectrometer, which are caused by vaporization of gas components discharged from constituent materials in an ion source of high vacuum, thus enabling achieving a further accurate mass spectrometry.

Samples are prepared in the same manner as in the methods (1), (2), and (3) described above.

A sample solution is coated on element surfaces 114 formed with no metallic film. While materials of metallic films 112, 113 can be selected optionally as far as they can be formed on the element surfaces, for example, Au, Al, Ag, etc. are listed as the materials.

The metallic films can be fabricated by means of a known method such as a deposition method such as deposition or sputtering, or a plating technique such as electroless plating, etc.

It is thought that the ionization element absorbs a light energy to be rapidly increased in temperature, thus contributing to a highly efficient ionization of sample molecules. Therefore, a material having a good absorptivity for laser beam promotes rapid heating further to attain a conspicuous ionization.

Also, it is desired that no thermal diffusion be caused in the plate in order to generate a very high temperature in the vicinity of laser irradiation spots. Therefore, it is desired that the substance be low in thermal diffusivity.

Also, for the purpose of adjusting adhesion between a measured sample and a surface, an insulating material thin film layer or a metallic material thin film layer can be deposited on the semiconductor substance. The deposited film can adjust adhesion between a sample and a surface and energy required for separation. Therefore, more samples for measurement can be made objects for measurement.

Figure 3:
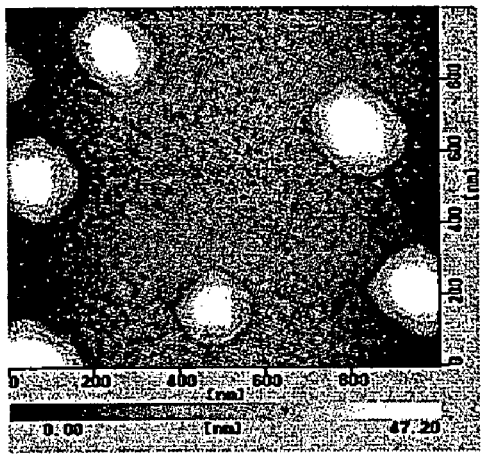
FIG. 3 shows pictures of a germanium dot structure element by an atomic force microscope and a scanning electron microscope.
Figure 3:
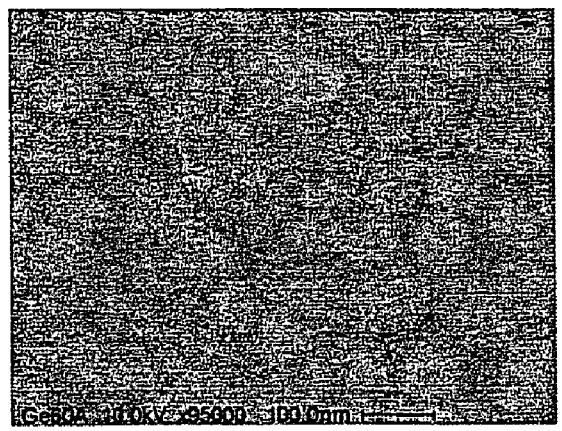
Figure 3:
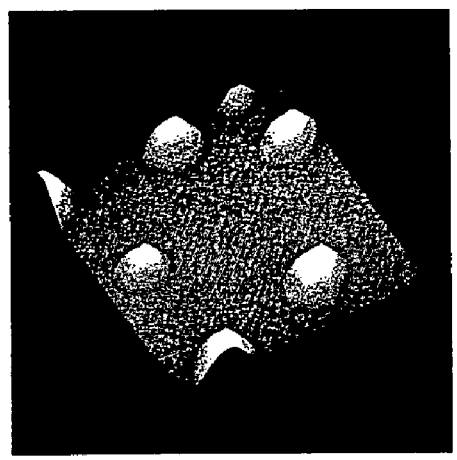

While embodiments and comparative examples are shown to specifically describe the content of the invention, they exemplify that the invention is suited to analysis of wide-ranging samples and the invention is not limited thereto. An ionization element used in the following embodiments is one, in which a germanium (Ge) dot structure is formed on a single crystal Si, and a method of manufacturing the ionization element is as follows but the invention is not limited thereto. That is, a germanium (Ge) dot structure was formed on a silicon wafer (crystal face (100)), which was heated to 540° C. and had a diameter of 50 mm, by the molecular-beam epitaxy method. A germanium (Ge) dot structure element obtained by cutting the substrate into a size of 10×10 mm was used as an ionization element to be put to an experiment. FIG. 3 shows pictures of the germanium dot structure element by an atomic force microscope and scanning electron microscope. A Ge dot on the element had an average height of 47 nm and an average diameter of 150 to 200 nm in the field of vision by the atomic force microscope, and an average diameter of 80 to 120 nm in the field of vision by the scanning electron microscope.

Embodiment 1

Re: Application of Peptide Sample Analysis

A peptide sample (angiotensin-I, monoisotope atomic mass number $[M+H]^+ = m/z 1296.7$) was dissolved into a methanol 30% solution containing 0.1% of a trifluoroacetic acid to prepare a sample solution of 400 fmol/μl to 800 attomol/μl. The sample solution (1 μl) was coated on a Ge dot structure element to be dried, and thereafter the element was stuck to a MALDI measurement sample base to be mounted on a time of flight mass spectrometer (Voyager DE-PRO), provided with a $N_2$ laser, for analysis.

Figure 4:
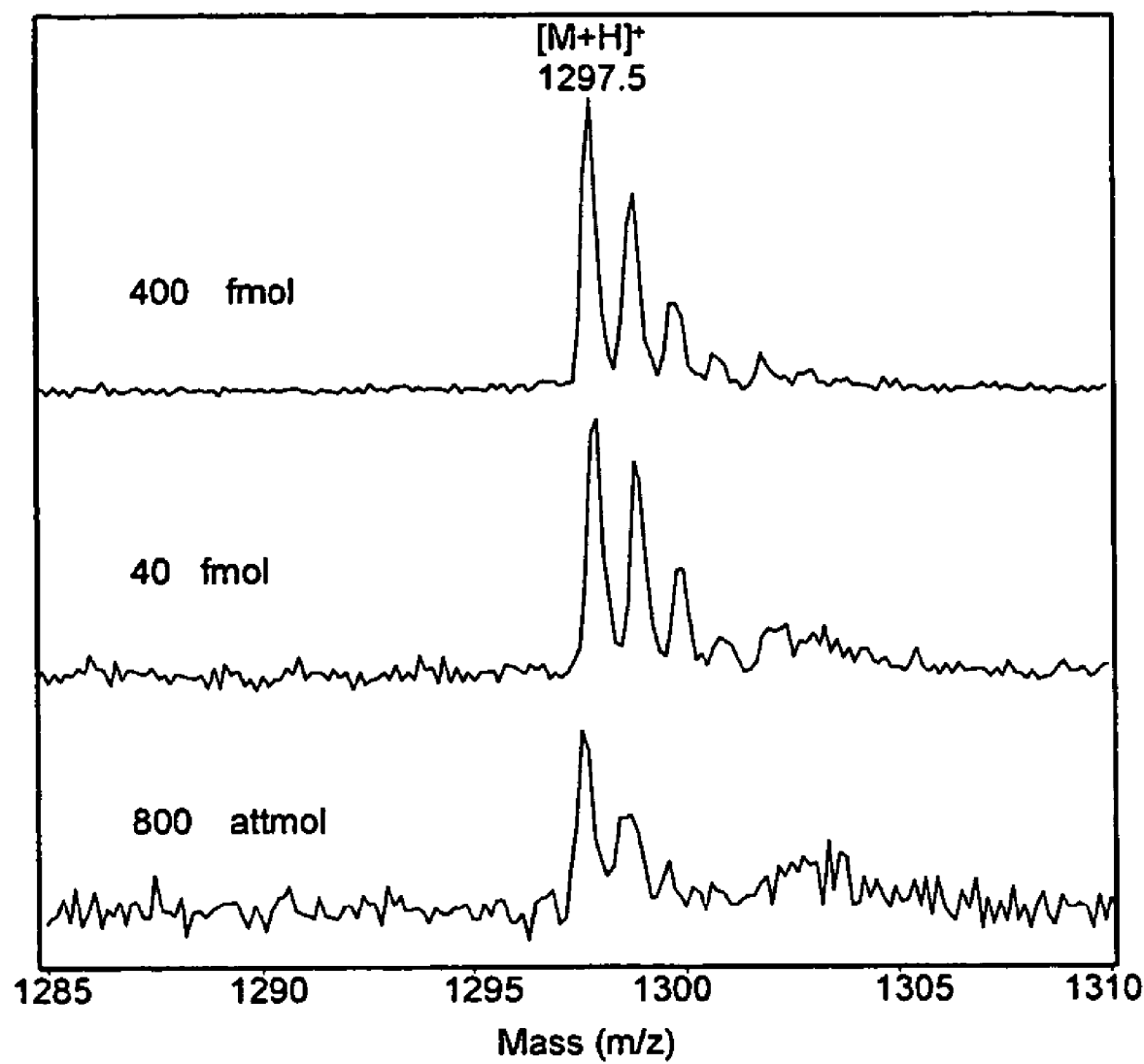
FIG. 4 shows mass spectrum of angiotensin-I in Embodiment 1.

FIG. 4 shows mass spectrum of angiotensin-I observed in the case where a Ge dot structure element was used. $[M+H]^+$ ion is clearly observed in mass number 1296.7. Amazingly, it is found that $[M+H]^+$ion is observed in a sample having as slight as 800 attomol and a lower limit of detection is further lower than 800 attomol. This example shows that mass spectrometry of high sensitivity for a peptide sample is attained by using the Ge dot structure element for ionization elements.

Embodiment 2

Re: Application to Analysis of Tryptic Digest of Protein (Peptide Fragments)

A sample of peptide fragments obtained by tryptic digest of bovine serum albumin (BSA) was dissolved into an acetonitrile 50% solution containing 0.1% of a trifluoroacetic acid to prepare a sample solution of 1 pmol//μl. The sample solution (1 μl) was coated on a Ge dot structure element to be dried, and thereafter the element was stuck to a MALDI measurement sample base to be mounted on a time of flight mass spectrometer (AXIMA CFR plus), provided with a $N_2$ laser, for analysis. For comparative example 1, MALDI-TOFMS measurement of the BSA tryptic digest was made with the use of α-cyano-4-hydroxycinnamic acid (CHCA) as a matrix reagent. The matrix reagent was dissolved into an acetonitrile 50% solution containing 0.1% of a trifluoroacetic acid to prepare a CHCA matrix reagent solution of 10 mg/ml. The CHCA matrix reagent solution and the sample solution were mixed together in a ratio of 5/1, and the mixed solution (1 μl) was coated on the MALDI measurement sample base to be dried, and thereafter mounted on the time of flight mass spectrometer (AXIMA CFR plus) provided with a $N_2$ laser, for analysis.

Figure 5:
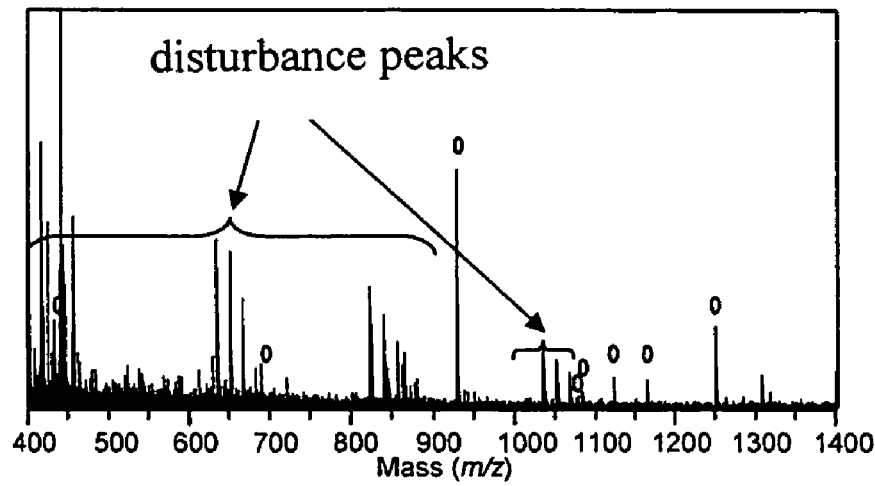
FIG. 5 shows mass spectrum of tryptic digests (peptide fragments) of bovin serum albumin in Embodiment 2, Comparative examples 1.
Figure 5:
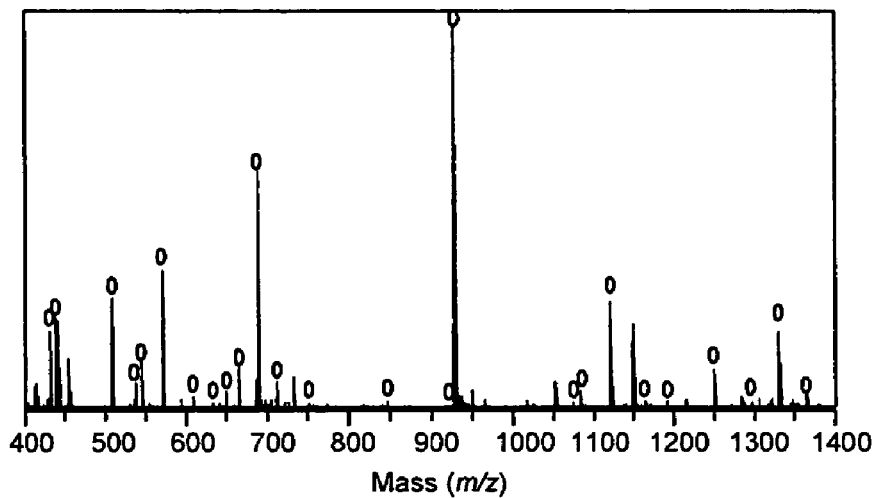

FIG. 5 shows mass spectra of BSA tryptic digest observed in the case where a Si/Ge dot structure element was used and the case by means of MALDI-TOFMS. In the mass spectrum observed by MALDI-TOFMS (comparative example 1), CHCA matrix reagent generated cluster ions, the disturbance peaks thus generated cover m/z 400 to 900 and m/z 1000 to 1100, as a result, it is difficult to distinguish between the disturbance peaks and the peaks of the peptide fragments.

On the other hand, the mass spectrum observed in the case where a Si/Ge dot structure element was used (Embodiment 2), 25 peaks of the peptide fragment are observed in the mass range of m/z 400 to 1400. Especially, in the mass range of m/z 400 to 900, where it is difficult to distinguish between the disturbance peaks and the peaks of the peptide fragments, 14 peaks of the peptide fragments are easily observed. Comparative example 1 and embodiment 2 show that the problem caused by the disturbance peaks of matrix reagents can be solved by using a dot structure element for ionization elements.

Embodiment 3

Re: Application of Oligosaccharide Sample Analysis

β-cyclodextrin (manufactured by Wako Pure Chemical) was dissolved into a 50% methanol to prepare a sample solution of 0.5 mg/mL. The sample solution (1 μl) was applied on a Ge dot structure element to be dried, and thereafter the element was stuck to the MALDI measurement sample base to be mounted on the time-of-flight mass spectrometer (Voyager DE-PRO) provided with a $N_2$ laser, for analysis.

Figure 6:
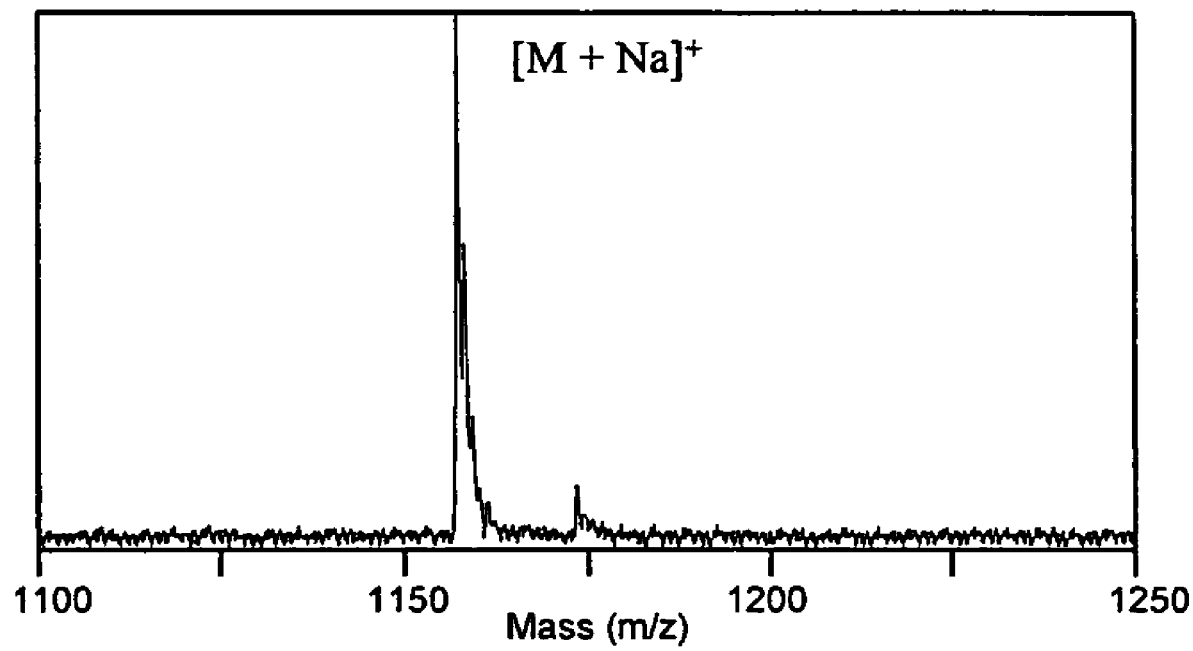
FIG. 6 shows mass spectrum of β-cyclodextrin in Embodiment 3.

FIG. 6 shows mass spectrum of β-cyclodextrin observed in the case where a Ge dot structure element was used. $[M+Na]^+$ ion is intensely observed in mass number 1157.4. This example shows that mass spectrometry of a glucide sample is made possible by using a dot structure element for ionization elements.

Embodiment 4

Re: Application to Analysis of Industrial Products (1)

A hindered phenol antioxidant (Irganox 1010, trade mark) was dissolved into chloroform containing sodium iodide of 0.5 mg/mL to prepare a sample solution of 0.5 mg/mL. The sample solution (1 μl) was coated on a Ge dot structure element to be dried, and thereafter the element was stuck to the MALDI measurement sample base to be mounted on the time of flight mass spectrometer (Voyager DE-PRO) provided with a $N_2$ laser, for analysis.

Figure 7:
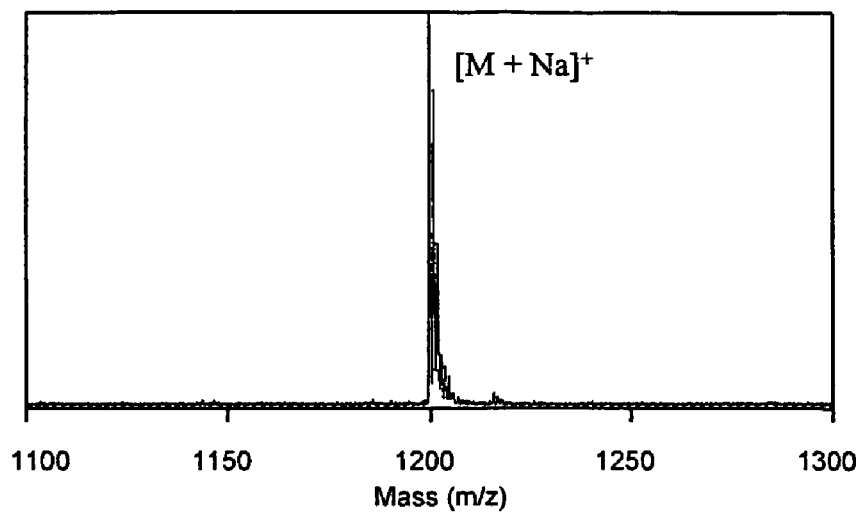
FIG. 7 shows mass spectrum of an antioxidant sample in Embodiment 4.

FIG. 7 shows mass spectrum of an antioxidant sample observed in the case where a Ge dot structure element was used. $[M+Na]^+$ ion of the antioxidant sample is intensely observed in mass number 1199.8. This example shows that mass spectrometry of an antioxidant sample is made possible by using a dot structure element for ionization elements.

Embodiment 5

Re: Application to Analysis of Industrial Products (2)

Polyethylene glycol (PEG, Sigma Aldrich Japan Ltd., Product Number 295906-5G) was dissolved into tetrahydrofuran to prepare a sample solution of 0.5 mg/mL. Sodium iodide was used as a cationization agent to prepare an ethanol solution of 0.5 mg/mL. The sample solution and the cationization agent solution were mixed together in a ratio of 2/1, a mixed solution (1 μl) was coated on a Ge dot structure element to be dried, and thereafter the element was stuck to the MALDI measurement sample base to be mounted on the time of flight mass spectrometer (Voyager DE-PRO) provided with a $N_2$ laser, for analysis. In addition, PEG has a chemical structure of HO—$(CH_2—CH_2$2-O$)_n$—H where n means the number of repeated units.

The value n of the sample is centered in the range of 40 to 50.

Figure 8:
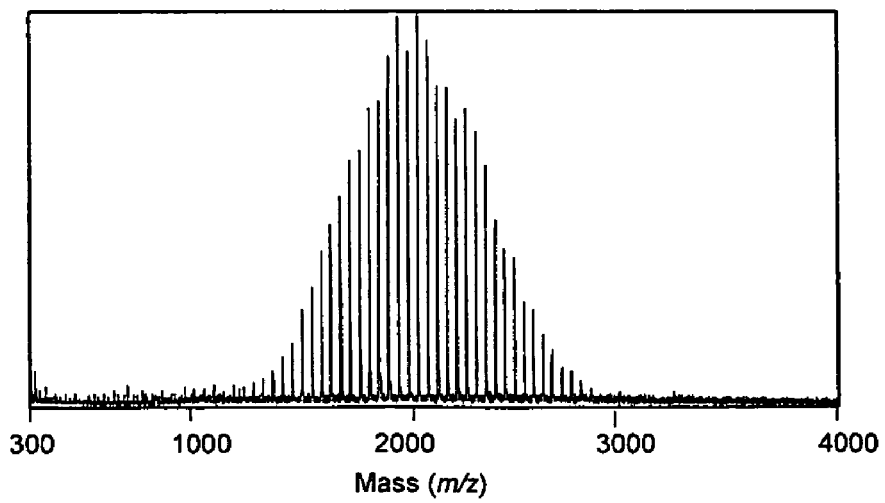
FIG. 8 shows mass spectrum of polyethylene glycol in Embodiment 5.

FIG. 8 shows a mass spectrum of PEG observed in the case where a Si/Ge dot structure element was used. $[M+Na]^+$ ion of PEG is observed to be distributed in the vicinity of mass number 1000 to 3000 with a maximum in the vicinity of mass number 2000. In addition, peaks appear at intervals of mass number 44 because of a distribution in PEG repeated units (—$CH_2$—$CH_2$—O, mass number 44). A number-average molecular weight calculated from the mass spectrum in FIG. 8 is 2080 to be consistent with an average molecular weight 1900 to 2200 described in a catalog (Sigma Aldrich Japan Ltd., General Catalog 2005-2006, page 1949). This example shows that an average molecular weight of a polymer sample can be correctly measured by using a dot structure element for ionization elements.

Embodiment 6

Re: Application to Analysis of Industrial Products (3)

A brominated flame retardant (decabromodiphenylether: DBDE) was dissolved into toluene to prepare a sample solution of 0.5 mg/mL. Silver trifluoroacetate was used as a cationization agent to prepare a tetrahydrofuran solution of 0.5 mg/mL. The sample solution and the cationization agent solution were mixed together in a ratio of 5/1, a mixed solution (1 μl) was coated on a Ge dot structure element to be dried, and thereafter the element was stuck to the MALDI measurement sample base to be mounted on the time of flight mass spectrometer (Voyager DE-PRO) provided with a $N_2$ laser, for analysis.

Figure 9:
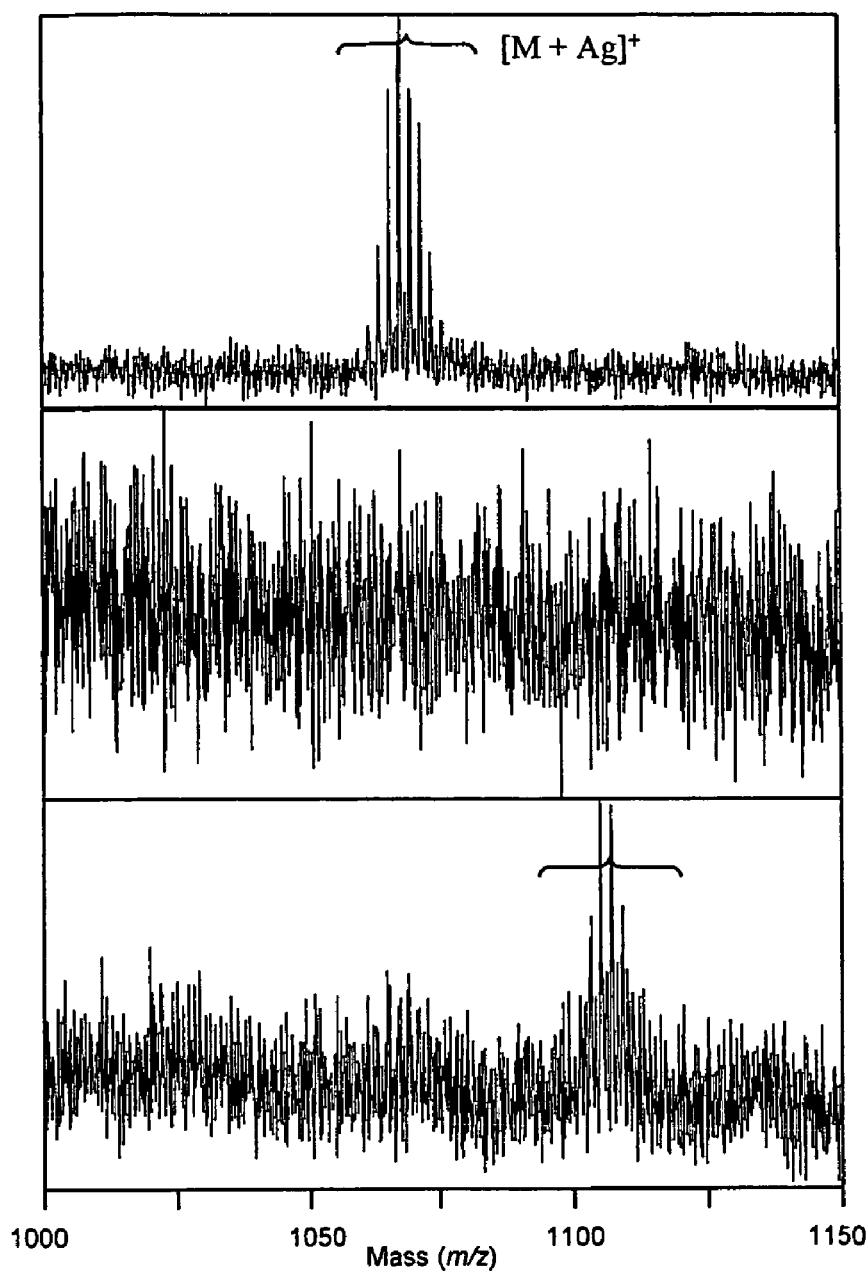
FIG. 9 shows mass spectra of decabromodiphenylether in Embodiment 6, Comparative examples 2 and 3.

FIG. 9 shows mass spectrum of DBDE observed in the case where a Ge dot structure element was used. $[M+Ag]^+$ion of DBDE is clearly observed in the vicinity of mass number 1060 to 1072. In addition, peaks appear at intervals of mass number 2 because $[M+Ag]^+$ion of DBDE contains Br and Ag, which have two kinds of stable isotopes differing by mass number 2u from each other, and reflects the distribution of the stable isotopes. Thus it is demonstrated that brominated flame retardants can also be measured with the use of a Ge dot structure element.

COMPARATIVE EXAMPLES 2 AND 3

MALDI-TOFMS measurement of DBDE was made with the use of 2,5-dihydroxy benzoic acid (DHB) and dithranol as matrix reagents. The respective matrix reagents were dissolved into tetrahydrofuran to prepare a matrix reagent solution of 10 mg/mL. The sample solution and the cationization agent solution were the same as those in Embodiment 6. The matrix reagent solution, the sample solution, and the cationization agent solution were mixed together in a ratio of 5/1/1, a mixed solution (1 μl) was coated on the MALDI measurement sample base to be dried, and thereafter mounted on the time of flight mass spectrometer (Voyager DE-PRO) provided with a $N_2$ laser, for analysis. Mass spectrum is shown together in FIG. 9.

In MALDI-TOFMS measurement (Comparative example 2) with the use of DHB as a matrix reagent, any peaks of DBDE could not be observed. It is thought that peaks of DBDE are not observed in MALDI-TOFMS because a mixed crystal of the matrix reagent and the sample is not prepared favorably. In MALDI-TOFMS measurement (Comparative example 3) with the use of dithranol as a matrix reagent, a peak is observed in the vicinity of m/z of 1100 to 1110 but it is apparently different from the mass number of $[M+Ag]^+$ion of DBDE and indefinite in attribution. It is thought that this is because DBDE made some reaction with the matrix reagent to be denatured, or fragments of the matrix reagent attached to DBDE. Even if the peak is attributable to DBDE, it is not suited to analysis due to its low sensitivity. Embodiment 5, and Comparative examples 2 and 3 present examples demonstrating that the problem described above is solved by the method of the invention, in which any matrix reagent is unnecessary.

What is claimed is:

1. A sample plate for laser desorption ionization mass spectrometry, comprising a surface, on which a plurality of convex quantum dot structures contacting a sample are distributed.

2. The sample plate according to claim 1, wherein the surface is of a smooth single crystal.

3. The sample plate according to claim 2, wherein the quantum dot structures are epitaxial structures on the surface.

4. The sample plate according to claim 1, wherein a layer is disposed upon said surface, the quantum dot structures being formed on the layer.

5. The sample plate according to claim 4, wherein the quantum dot structures are formed on said layer, said layer being a self-organizing layer physically deposited on said surface.

6. The sample plate according to claim 4, wherein the quantum dot structures are formed on said layer, said layer being a self-organizing layer, which is chemically deposited on said surface.

7. The sample plate according to claim 1, wherein the quantum dot structures are bonded chemically with the surface.

8. The sample plate according to claim 1, wherein the quantum dot structures comprise microcrystals of a specific magnitude on the plate surface.

9. The sample plate according to claim 1, wherein the quantum dot structures comprise a semiconductor.

10. The sample plate according to claim 1, wherein the quantum dot structures are selected from one or more materials that are different from the material of said surface.

11. The sample plate according to claim 1, wherein the quantum dot structures are formed on a single crystal semiconductor surface.

12. The sample plate according to claim 11, wherein the quantum dot structures are of Ge on a single crystal Si substrate.

13. The sample plate according to claim 11, wherein the quantum dot structures are selected from a group comprising an InAs mixed crystal on a GaAs substrate, an InGaAs mixed crystal on a GaAs substrate, an InN mixed crystal on a GaAs substrate, an InGaN mixed crystal on a GaAs substrate, an InN mixed crystal on a GaN substrate, an InGaN mixed crystal on a GaN substrate, an InN mixed crystal on an AlN substrate, a GaN mixed crystal on an AlN substrate, an InGaN mixed crystal on an AlN substrate, a GaSb mixed crystal on a GaAs substrate, an InGaSb mixed crystal on a GaAs substrate, an InGaSb mixed crystal on a GaSb substrate, or a SiGe alloy on a Si substrate.

14. The sample plate according to claim 1, further comprising a sample plate holder of electrically conductive material.

15. The sample plate according to claim 1, wherein the sample plate is included within a laser desorption ionization mass spectrometer.

16. A method, comprising: chemically modifying a sample coated portion of a sample plate for laser desorption ionization mass spectrometry, the sample plate comprising a surface on which a plurality of convex quantum dot structures are distributed.

17. A method for processing a sample plate comprising a surface on which a plurality of quantum convex dot structures are distributed, the quantum dot structures being formed on a single crystal semiconductor surface, comprising: growing a mixed crystal epitaxially on a substrate.

18. The method of claim 17, wherein the quantum dot structures are selected from a group comprising an InAs mixed crystal on a GaAs substrate, an InGaAs mixed crystal on a GaAs substrate, an InN mixed crystal on a GaAs substrate, an InGaN mixed crystal on a GaAs substrate, an InN mixed crystal on a GaN substrate, an InGaN mixed crystal on a GaN substrate, an InN mixed crystal on an AlN substrate, a GaN mixed crystal on an AlN substrate, an InGaN mixed crystal on an AlN substrate, a GaSb mixed crystal on a GaAs substrate, an InGaSb mixed crystal on a GaAs substrate, an InGaSb mixed crystal on a GaSb substrate, or a SiGe alloy on a Si substrate.

19. A method of making a sample adapted for laser desorption ionization mass spectrometry, the method comprising: coating and drying a solved sample on a surface of a sample plate for laser desorption ionization mass spectrometry, the sample plate comprising a surface on which a plurality of convex quantum dot structures are distributed.

* * * * *